US005363628A

United States Patent [19]

Basar et al.

[11] Patent Number: 5,363,628

[45] Date of Patent: Nov. 15, 1994

[54] THERMAL BARRIER APPARATUS AND PROCESS FOR FABRICATING SAME

[75] Inventors: Ronald J. Basar, Geneva; Joseph C. Benedyk, Lake Zurich, both of Ill.

[73] Assignee: Alumax Extrusions, Inc., West Chicago, Ill.

[21] Appl. No.: 831,154

[22] Filed: Feb. 5, 1992

[51] Int. Cl.[5] ........................ B23P 11/02; B29C 65/00

[52] U.S. Cl. .................................... 52/745.19; 29/450; 29/451; 264/249

[58] Field of Search ............... 52/745.19, 730.3, 730.6, 52/745.2; 29/451, 450, 446, 428; 264/249

[56] References Cited

U.S. PATENT DOCUMENTS 3,114,179 12/1960 Briggs .
3,204,324 12/1962 Nilsen .
3,212,179 3/1963 Koblensky .
3,411,254 5/1966 Kessler .
3,441,995 5/1969 Revell et al. ...................... 52/745.19
3,832,818 9/1974 Nahr .
3,992,769 11/1976 Jackson ................................. 29/451
4,069,631 1/1978 Nahr .
4,117,640 10/1978 Vanderstar .......................... 52/730.3
4,158,512 6/1979 Hasselbacher .
4,461,133 7/1984 LaRoche ............................ 52/730.3
4,704,839 10/1987 Kay .

FOREIGN PATENT DOCUMENTS 2221179 11/1973 Germany ........................... 52/730.6

*Primary Examiner*—Michael Safavi
*Attorney, Agent, or Firm*—Dick and Harris

[57] ABSTRACT

A thermal barrier apparatus and process for fabricating same, wherein the apparatus provides insulation between two or more juxtaposed frame members which may be simultaneously exposed to different temperatures and environmental conditions. A stretchable attachment strip, which is stretched to a reduced insertion shape, is at least partially inserted within corresponding strip acceptance channels of the two or more juxtaposed frame members. After the attachment strip has been properly inserted, there is a recovery step during which the stretched attachment strip recovers back towards a recovered restraining shape which not only binds the juxtaposed frame members together, but which also results in a contiguous but thermally broken profile.

7 Claims, 4 Drawing Sheets

FIG. 4
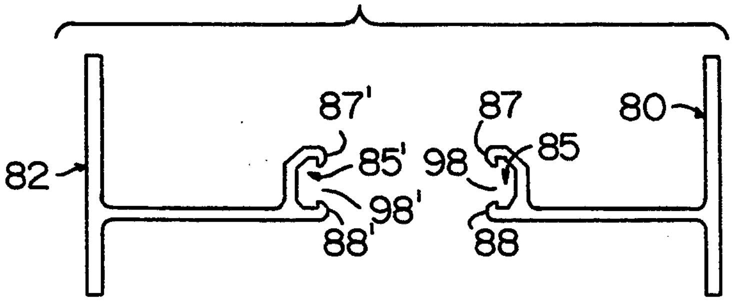
FIG. 5
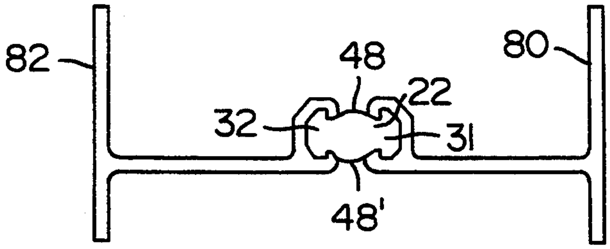
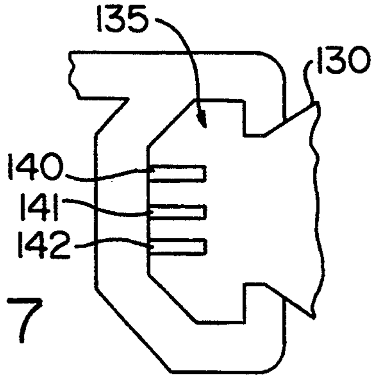
FIG. 7
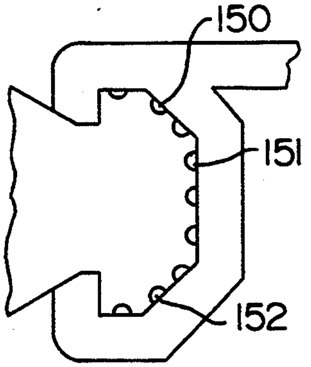
FIG. 8
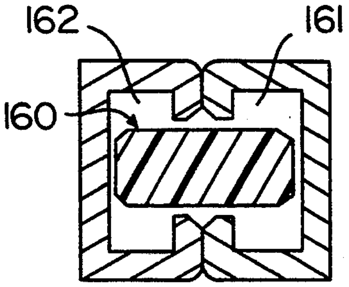
FIG. 9

THERMAL BARRIER APPARATUS AND PROCESS FOR FABRICATING SAME

BACKGROUND OF THE INVENTION

The present invention relates in general to thermal breaks which provide an insulated and supporting connection between two or more juxtaposed frame members, and, more particularly, to a thermal barrier apparatus and process for fabricating same wherein the thermal break comprises a stretchable attachment strip which is stretchable to a reduced shape for insertion into a strip acceptance channel of corresponding frame members, and then recoverable to a recovered restraining shape which binds the frame members together in a restrained insulated position.

Traditionally, thermal barriers, and more particularly thermal barriers having juxtaposed metal frame members, have been fabricated by extruding metal, such as aluminum, through a single die, to in turn create two frame members which are physically attached by a U-shaped cavity. After the frame members have been extruded, an insulating material, such as polyurethane, is eventually inserted within the cavity. An example of such prior art is U.S. Pat. No. 4,704,839. Insertion of the insulating material typically results by pouring a prepared thermal set urethane liquid into the U-shaped cavity of the extrusion. Of course, prior to such pouring, the ends of the cavity must be temporarily plugged so as to maintain the urethane liquid therewithin.

After the urethane liquid has been poured into the cavity, it must set until it hardens. Unfortunately, the appropriate hardness may take as much as up to twenty-four hours to achieve. Regardless, after the urethane has properly hardened, the temporary plugs should be removed from the cavity ends, and then the portion of the extrusion forming the bottom of the cavity must be cut away so as to form two or more separate metal frame elements having a contiguous profile with a thermal break.

Although such thermal barriers have been effective, they have, and do, result in unnecessary expense and delays in fabrication. For example, inasmuch as the extrusion of the frame members result in two united frame members physically attached to each other, the unit must be painted together. Accordingly, should it be desirous to have one half of the frame painted one color, and the other half painted another (such as for a window frame for a building where the outside portion of the frame is to be painted the color of the outside of the building, and the inside portion of the frame is to be painted the color of an inside room) the frame members must be masked off for each such color to be painted.

Other problems which can result from poured insulating material is that an incorrect amount of catalyst can be mixed in with the insulating material—thus resulting in a defective thermal break. The defective thermal break must then be cut out, removing portions of the aluminum extrusions in the process, thereby destroying the possibility of reusing those extrusions for anything other than recyclable scrap. Recycling of the aluminum extrusions in a melting operation can not be done with the thermal break in place because it would contaminate the metal and also would damage the environment. Furthermore, inasmuch as the frame members in such prior art are extruded with the connecting cavity, extra material must be used and extra processes must be utilized for removal of the cavity material after the insulating material has effectively cured.

Although thermal barriers which utilize two separately extruded frame portions and a non-poured insulating insert for providing a thermal break therebetween have been known in the art for many years, such art does not teach, much less disclose a stretchable insulating strip which is stretchable to a reduced insertion shape and then recoverable to a recovered restraining shape. An example of a thermal barrier utilizing two separate frame members and a non-poured insulating strip is U.S. Pat. No. 3,411,254. Although the '254 patent discloses a thermal barrier which utilizes a preformed thermal break constructed from a plastic material which is slideably inserted into the channels of two corresponding frame members, the plastic strip itself is formulated with an internally mixed blowing agent. This blowing agent causes slight expansion of the strip upon exposure of heat. The blowing agent results in an uncontrolled expansion of the plastic strip during such exposure to heat which could result in scrap generation with attendant problems similar to those associated with poured thermal break systems. In addition, the channels of the frame members preferably include flanges which are bent, or crimped, into the plastic strip after insertion and prior to exposure to the heat so as to "lock" the plastic strip in place.

It is thus an object of the present invention to provide a thermal barrier apparatus which utilizes an extruded attachment strip which is stretchable to a reduced insertion shape and then recoverable to a recovered restraining shape which binds two or more juxtaposed frame members together in a restrained insulated orientation.

It is further an object of the present invention to provide a thermal barrier apparatus which maintains such restrained binding as the result of expansion forces being applied within the strip acceptance channels of the frame members.

It is also an object of the present invention to provide a thermal barrier apparatus which is constructed from independent frame members so as to preclude the need for extra material usage, the extra process needed for removal of such material, as well as the extra process required to mask the different halves of an otherwise unitary frame member when different colors of paint are required for each of the frame member portions.

It is still further an object of the present invention to provide a thermal barrier apparatus which utilizes an extruded stretchable thermal strip to mechanically join the two or more juxtaposed frame members together so as to provide a contiguous thermally broken profile, and, to ensure consistent quality control for each of the strips so extruded.

And, it is also an object of the present invention to provide a thermal barrier apparatus which can be manufactured quickly and relatively inexpensively, and, without the need to use more material than is necessary for the finished product.

These and other objects of the present invention will become apparent in light of the present specification and drawings.

SUMMARY OF THE INVENTION

The present invention comprises a thermal barrier apparatus and process for fabricating same, wherein the apparatus provides an insulated, supporting connection between two or more juxtaposed frame means, such as extruded aluminum and other metal frames for windows, doors and closure panels, wherein adjacent portions of the two or more frame means may be simultaneously exposed to different temperatures and environmental conditions requiring such insulation.

The thermal barrier apparatus includes one or more stretchable attachment strip means each of which have a longitudinal axis, and an exterior surface, including a first side, a second side opposite the first side, a top side, and a bottom side opposite the top side, for defining an outer peripheral shape. Each of the one or more attachment strip means are stretchable and recoverable, to alternatively stretch the one or more attachment strip means generally along the longitudinal axis and reduce the outer peripheral shape to a reduced insertion shape, and then recover it back toward a recovered restraining shape. This recovered restraining shape is capable of binding each of the two or more juxtaposed frame means in a restrained insulated position to, in turn, create a thermal barrier therebetween.

At least one of the frame means are exposable to a first environment and at least one of the frame means are exposable to a second environment so as to require thermal insulation therebetween. Each of the two or more juxtaposed frame means have at least one strip acceptance channel means integrally formed with at least a portion of the two or more frame means for facilitating operable acceptance of at least a portion of the one or more stretchable attachment strip means while in the recovered restraining shape to in turn, effectuate the restrained, insulated position therebetween the two or more frame means and the one or more stretchable attachment strip means. Each of the strip acceptance channel means include strip locking means for operably securing the first and second sides of at least a portion of the stretchable attachment strip means within a corresponding strip acceptance channel means.

In one preferred embodiment of the invention, the stretchable attachment strip means further includes securement means for securable cooperation with the strip locking means of a corresponding one of the strip acceptance channel means. The securement means may comprise at least one rib means integrally formed with each of the first and second sides of the exterior surface in substantially parallel relationship to at least a portion of the longitudinal axis of a corresponding stretchable attachment strip means. Each of the rib means are recoverable from a reduced insertion shape to a recovered restraining shape. The recovered restraining shape consists of the at least one rib means having a greater transverse cross-sectional dimension than the transverse cross-sectional dimension of the corresponding strip acceptance channel means. Accordingly, such a configuration serves to bind each of the at least one rib means within the corresponding ones of the strip acceptance channel means as the result of an interference fit therebetween. It is also contemplated that the one or more stretchable attachment strip means include one rib means on the first side of the exterior surface and one rib means on the second side of the exterior surface.

In another preferred embodiment of the invention, the one or more stretchable attachment strip means further include automatic spacing means integrally formed with at least a portion of the exterior surface for operable cooperation with a portion of the two or more juxtaposed frame means—so as to automatically space apart the two or more juxtaposed frame means during recovery of the one or more stretchable attachment strip means from the reduced insertion shape toward and into the recovered restraining shape.

The automatic spacing means may comprise one or more wedge members integrally formed on the top and/or bottom sides of the exterior surface of the stretchable attachment strip means. The wedge members include apexes which are positioned in substantially parallel relationship to at least a portion of the longitudinal axis of a corresponding one or more stretchable attachment strip means.

In another preferred embodiment of the invention, the two or more juxtaposed frame means further include spacing cooperation means which are integrally formed with the strip acceptance channel means for operable cooperation with the automatic spacing means of the one or more stretchable attachment strip means. The spacing cooperation means facilitate operable spacing of the two or more juxtaposed frame means during expansion of the one or more stretchable attachment strip means from the reduced insertion shape to the recovered restraining shape.

In one embodiment of the invention, the one or more stretchable attachment strip means further include air pocket means integrally positioned within at least one of the first, second, top and bottom sides for decreasing thermal transfer into and through the one or more stretchable attachment strip means.

In another embodiment of the invention, the thermal barrier apparatus includes adhesive means which are operably applied between at least a portion of each of the strip acceptance channel means and at least a portion of the exterior surface of the one or more stretchable attachment strip means for increasing secured attachment therebetween.

In the preferred embodiment of the invention, the one or more stretchable attachment strip means include at least one condensation bridge avoidance means for precluding inadvertent thermal connection of the two or more frame means which could otherwise result from the formation and collection of condensation upon and across the one or more stretchable attachment strip means. The condensation bridge means comprise one or more wedge members, having apexes, integrally formed on opposed sides of the exterior surface of the one or more stretchable attachment strip means.

In the preferred embodiment of the invention, the outer peripheral shape of the one or more stretchable attachment strip means comprise a first cross-sectional configuration prior to it being stretched, and a second cross-sectional configuration after the stretchable attachment strip means has recovered from being stretched. In addition, the first and second cross-sectional configurations are substantially identical to each other. Furthermore, it is also contemplated that the one or more stretchable attachment strips be constructed from a commercially available extruded plastic material such as thermoplastic polyurethane, polyvinyl chloride, ethylenevinyl acetate copolymer, crosslinked ethylenevinyl acetate copolymer, crosslinked polyethylene, thermosetting elastomeric plastic, as well as thermosetting rubber to name a few.

The invention includes the process for constructing a thermal barrier apparatus which thermally improves mechanical connection between two or more juxtaposed separated frame members having strip acceptance channels for acceptance of a portion of an attachment strip, wherein each of the two or more juxtaposed separated frame members are connected by one or more stretchable attachment strips each having a longitudinal axis, an exterior surface including a first side, a second side opposite the first side, a top side, a bottom side opposite the top side, and a transverse cross-sectional dimension, and wherein each of the juxtaposed frame members may be exposed to different temperatures and environmental conditions after the thermal barrier apparatus is constructed. The process includes the steps of a) aligning and maintaining the two separated frame members in juxtaposition in preparation for insertion of the stretchable attachment strips; b) stretching the one or more stretchable attachment strips from a first transverse cross-sectional dimension which is greater than that of the transverse cross-sectional dimension of the corresponding strip acceptance channel, to a second cross-sectional dimension less than the transverse cross-sectional dimension of the corresponding strip acceptance channel; c) inserting the one or more stretched attachment strips between the two or more juxtaposed frame members so that at least a portion of the one or more stretched attachment strips are operably positioned within the corresponding strip acceptance channels of the frame members; and d) recovering each of the stretched attachment strips back toward the first transverse cross-sectional dimension so as to bind a portion of the stretchable attachment strips within the corresponding strip acceptance channels, to in turn, result in a restrained thermal connection therebetween the two juxtaposed frame members.

In the preferred embodiment of the process, the step of recovering each of the one or more stretched attachment strips further comprises the step of exposing the one or more stretched attachment strips to temperatures other than those experienced through ambient air so as to induce recovery toward the first transverse cross-sectional dimension.

In this preferred embodiment of the invention, the process for constructing a thermal barrier apparatus further includes the step of extruding the one or more stretchable attachment strips, as well as cooling same.

In another embodiment, the process for constructing a thermal barrier apparatus further includes the step of automatically spacing apart the two juxtaposed frame members after the one or more stretchable attachment strips have been inserted therebetween. Such automatic spacing apart is the result of expansion forces which occur as the one or more stretched attachment strips recover back toward the first transverse cross-sectional dimension.

In yet another embodiment, the process for constructing a thermal barrier apparatus further comprises the step of painting each of the two separated frame members prior to the step of inserting the one or more stretchable attachment strips into the corresponding acceptance channels. Furthermore, an additional step of painting at least one of the two separated frame members a different color than that of the other is also contemplated.

In another embodiment of the invention, the process for fabricating a thermal barrier apparatus further includes the step of applying an adhesive to a portion of the acceptance channels prior to the step of inserting the one or more stretched attachment strips therein.

BRIEF DESCRIPTION OF THE DRAWINGS

FIG. 4 of the drawings is an elevated front view of two juxtaposed separated frame means, and the configuration of the rib acceptance channel means;

FIG. 5 of the drawings is an elevated front view of the thermal barrier apparatus, showing in particular, the two juxtaposed frame means, the stretchable attachment strip means in its recovered restraining shape, and, the contiguous but thermally broken profile resulting from the connection of the two frame means by the stretchable attachment strip means;

FIG. 7 of the drawings is a cut-away sectional view of the thermal barrier apparatus, showing, in particular, air pockets extruded into the stretchable attachment strip means;

FIG. 8 of the drawings is a cut-away sectional view of the thermal barrier apparatus, showing, in particular, air pockets extruded into the stretchable attachment strip means;

FIG. 9 of the drawings is a cross-sectional view of the thermal barrier apparatus, showing, in particular, a rectangular cross-sectional shape of the stretchable attachment strip means after it has been stretched into its reduced insertion shape.

DETAILED DESCRIPTION OF THE DRAWINGS

Figure 1:
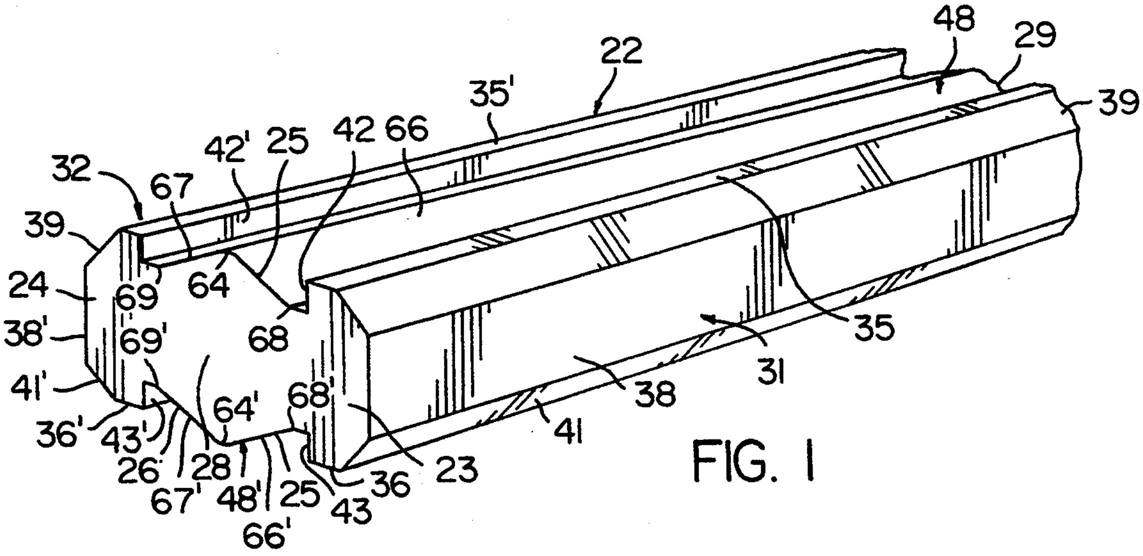
FIG. 1 of the drawings is an elevated perspective view of the stretchable attachment strip means, showing in particular, the rib means and the wedge members positioned between the rib means.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Figure 2:
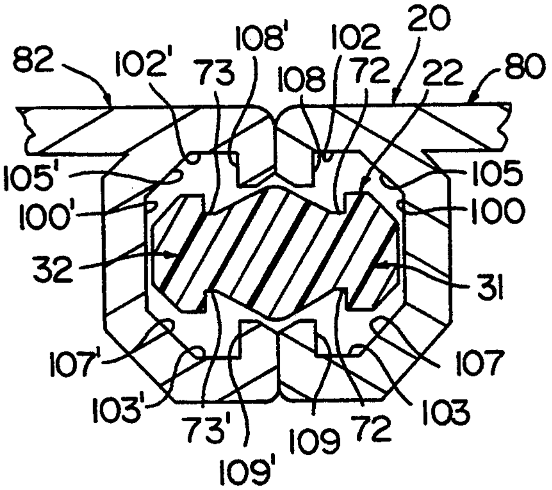
FIG. 2 of the drawings is a cross-sectional view of the thermal barrier apparatus, showing in particular, the reduced insertion shape of the stretchable attachment strip means positioned within the rib acceptance channel means of two juxtaposed frame means and, further showing the alignment of the wedge members with the chamfered sections of the extension members.

Thermal barrier apparatus 20 is shown in FIG. 2 as comprising stretchable attachment strip means 22, as shown more fully in FIG. 1, and two juxtaposed frame means 80 and 82. Stretchable attachment strip means 22 includes first side 23, second side 24, top side 25, bottom side 26 and first and second end portions 28 and 29, respectively (FIG. 1). First and second sides 23 and 24 each include rib means 31 and 32, respectively—each of which are integrally formed with the respective side from which they depend. Rib means 31 and 32 each include a top surface 35, 35', a bottom surface 36, 36', an outer surface 38, 38', an upper oblique angled surface 39, 39', a lower oblique angled surface 41, 41', an upper back surface 42, 42' and a lower back surface 43, 43'. Each of the top surfaces 35, 35' are positioned in substantially parallel relationship to the bottom surfaces 36, 36'; each of the outer surfaces 38, 38' are positioned in substantially transverse relationship to the top and bottom surfaces 35, 35' and 36 36', respectively; and, the upper and lower oblique surfaces 39, 39' and 41, 41' are operably disposed between the adjacently positioned top and outer surfaces and the lower and outer surfaces, respectively. Furthermore, upper back surfaces 42, 42' are adjacently positioned to top side 25 of stretchable attachment strip means 22 in substantially transverse relationship to top surfaces 35, 35', and bottom surfaces 43, 43' are adjacently positioned to bottom side 26 of stretchable attachment strip means 22 in substantially transverse relationship to bottom surfaces 36, 36'. Although rib members 31 and 32 are shown as having multi-faceted quasi-rectangular cross-sectional configurations, other types of configurations, such as rectangular (as shown in FIG. 9), or even asymmetrical configurations, are also contemplated.

Stretchable attachment strip means 22, as shown in FIGS. 1, 2, 3 and 5, further include top wedge member 48, which is integrally formed with top side 25 of the attachment strip, and bottom wedge member 48' which is integrally formed with bottom side 26. Both of these wedge members are substantially symmetrical in configuration, and are positioned between rib members 31 and 32, respectively. As shown in FIG. 1, wedge members 48, 48' each include apexes 64, 64' and two opposed sloping regions 66, 66' and 67, 67'. The sloping regions descend from the respective apexes until they reach converging points 68, 68' and 69, 69' of the respective top side 25 and bottom side 26 of stretchable attachment strip means 22. These converging points are distally located from the respective upper back surfaces 42, 42' and lower back surfaces 43, 43' of the rib means, so as to maintain flat regions 72, 72' and 73, 73' (FIG. 2) on top side 25 and bottom side 26 of stretchable attachment strip means 22.

Figure 3:
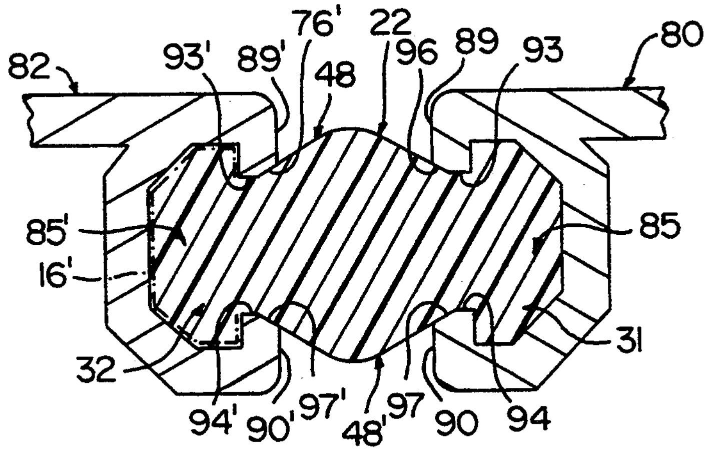
FIG. 3 of the drawings is a cross-sectional view of the thermal barrier apparatus, showing in particular, the stretchable attachment strip means in its recovered restraining shape, and, accordingly, further showing the two juxtaposed frame means in a restrained insulated position as well as a modification on one side wherein an adhesive is applied between the stretchable attachment strip means and the rib acceptance channel means.

Wedge members 48, 48' serve several functions. Not only do the wedge members increase the rigidity of stretchable attachment strip means 22, but they also aid in automatically spacing apart the two juxtaposed frame members 80 and 82 during the recovery of stretchable attachment strip means 22 from its stretched reduced insertion shape (FIG. 2) toward and into its recovered restraining shape (FIG. 3). Furthermore, wedge members 48, 48' also help eliminate "cold spots" which typically result from the build up of condensation which collects on the surface of a thermal break. Indeed, as excessive condensation forms, it could, in the absence of wedge members 48, 48' bridge across the thermal break while remaining in contact with the juxtaposed frame members—such a bridge would serve as a conduit for increased thermal transfer from one frame member to the other. Accordingly, the wedge members, and more particularly apexes 64, 64' actually serve as a barrier against such a bridging effect.

Juxtaposed frame means 80 and 82 are shown in FIG. 2 and FIG. 4 as including rib acceptance channel means 85, 85' (FIG. 4) and spacing cooperation means 87, 87' and 88, 88' (FIG. 4) integrally formed with the respective frame means. The rib acceptance channel means, as shown in FIG. 2, are each defined by a back wall 100, 100', a top wall 102, 102', a bottom wall 103, 103', an upper oblique wall 105, 105', a lower oblique wall 107, 107', an upper front wall 108, 108' and a lower front wall 109, 109'. Back wall 100, 100' is positioned in substantially parallel relationship with upper front wall 108, 108' and lower front wall 109, 109'; and, the top and bottom walls 102, 102' and 103, 103', respectively, are positioned substantially transverse to adjacently positioned upper and lower front walls. In addition, upper oblique walls 105, 105' are integrally attached between back walls 100, 100' and top walls 102, 102'; and, lower oblique walls 107, 107' are integrally attached between back walls 100, 100' and bottom walls 103, 103'. Furthermore, upper and lower front walls 108, 108' and 109, 109', respectively, comprise a portion of spacing cooperation means 87, 87' and 88, 88'.

As shown in detail in FIG. 2 and FIG. 3, the cross-sectional configuration of rib acceptance channel means 85, 85' is substantially similar to the cross-sectional configuration of rib means 31 and 32. Accordingly, such a configuration facilitates a secure interference fit between the rib means and the rib acceptance channel means after stretchable attachment strip means 22, and, more particularly, rib means 31 and 32, recover back toward their recovered restraining shape (FIG. 3). Once such a recovered restraining shape has been obtained, or nearly obtained, outer surface 38, 38' of rib means 31 and 32 will abut with back walls 100, 100' of rib acceptance channel means 85, 85', upper and lower oblique surfaces 39, 39' and 41, 41', respectively, will abut with upper and lower oblique walls 105, 105' and 107, 107', respectively, top and bottom surfaces 35, 35' and 36, 36', respectively, will abut with top and bottom walls 102, 102' and 103, 103', respectively, and upper and lower back surfaces 42, 42' and 43, 43' respectively, will abut with upper and lower front walls 108, 108' and 109, 109', respectively—to in turn, result in a secure interference fit therebetween. It is also contemplated that adhesive 161 be applied between the rib means and the rib acceptance channel means for providing additional securement therebetween (FIG. 3). Furthermore, the cross-sectional configuration of the rib means, and, in turn, the stretchable attachment strip means prior to being stretched, will be substantially the same as the cross-sectional configuration after the stretched attachment strip is allowed to recover.

Spacing cooperation means 87, 87' and 88, 88' (FIG. 4), which cooperate with wedge members 48, 48' for automatically spacing apart the frame means during recovery of stretchable attachment strip means 22 towards its recovered restraining shape, include relatively short extension members 89, 89' and 90, 90' (FIG. 3). These extension members define an aperture 98, 98', as shown in FIG. 4, which enables entry of the rib means within rib acceptance channel means 85, 85'. Extension members 89, 89' and 90, 90', as shown in FIG. 3, include flat end portions 93, 93' and 94, 94' and chamfered sections 96, 96' and 97, 97'. As shown in detail in FIG. 3, the chamfered sections and flat end portions of exterior member 89, 89' and 90, 90' actually abut in a substantially contoured coplanar relationship with a portion of sloping regions, such as sloping region 66 (FIG. 1), and, flat end portions, such as flat end portion 93, of stretchable attachment strip means 22 after the attachment strip has recovered to its recovered restraining shape. Such contoured abutment actually serves as a locking means for precluding the inadvertent release of the rib means from the channel means.

Three alternative embodiments of the stretchable attachment strip means are shown in FIGS. 7 through 9. Inasmuch as the frame means depicted in such alternative embodiments are primarily of the same or similar construction, further description of the frame means will not be necessary.

Stretchable attachment strip means 130, and more particularly, rib means 135, is shown in FIG. 7 after it has recovered to its recovered restraining shape within the rib acceptance channel means. Rib means 135 includes a plurality of integrally formed air pockets 140, 141 and 142. As can be seen, these air pockets are positioned adjacent to the interior surface of the rib acceptance channel means. Air pockets, such as air pockets 150, 151 and 152 are shown in FIG. 8 as one alternative configuration to those shown in FIG. 7. These air pockets (FIG. 7 and FIG. 8) not only serve to reduce thermal transfer from the frame means—due to less material in actual contact with the frame means—but they also result in a reduction of material required, and, accordingly, a reduction in material cost. Although these air pockets are shown as being integrally formed with the rib means, it is also contemplated that the air pockets result from grooves or protrusions on the inside surfaces of the rib acceptance channel means.

Stretchable attachment strip means 160 is shown in FIG. 9 as having a substantially rectangular cross-sectional configuration. Accordingly, even though such a design does not incorporate rib means (such as those shown in FIG. 1), actual binding of two juxtaposed frame means will result from the use of any commercially available polymer which possesses compressibility characteristics which would allow the stretchable attachment strip means 160 to substantially occupy and conform to strip acceptance channel means 161 and 162. However, it is likely that such a polymer would result in a stretchable attachment strip which would be more resilient than the polymers usable for the previously described embodiments.

Figure 6:
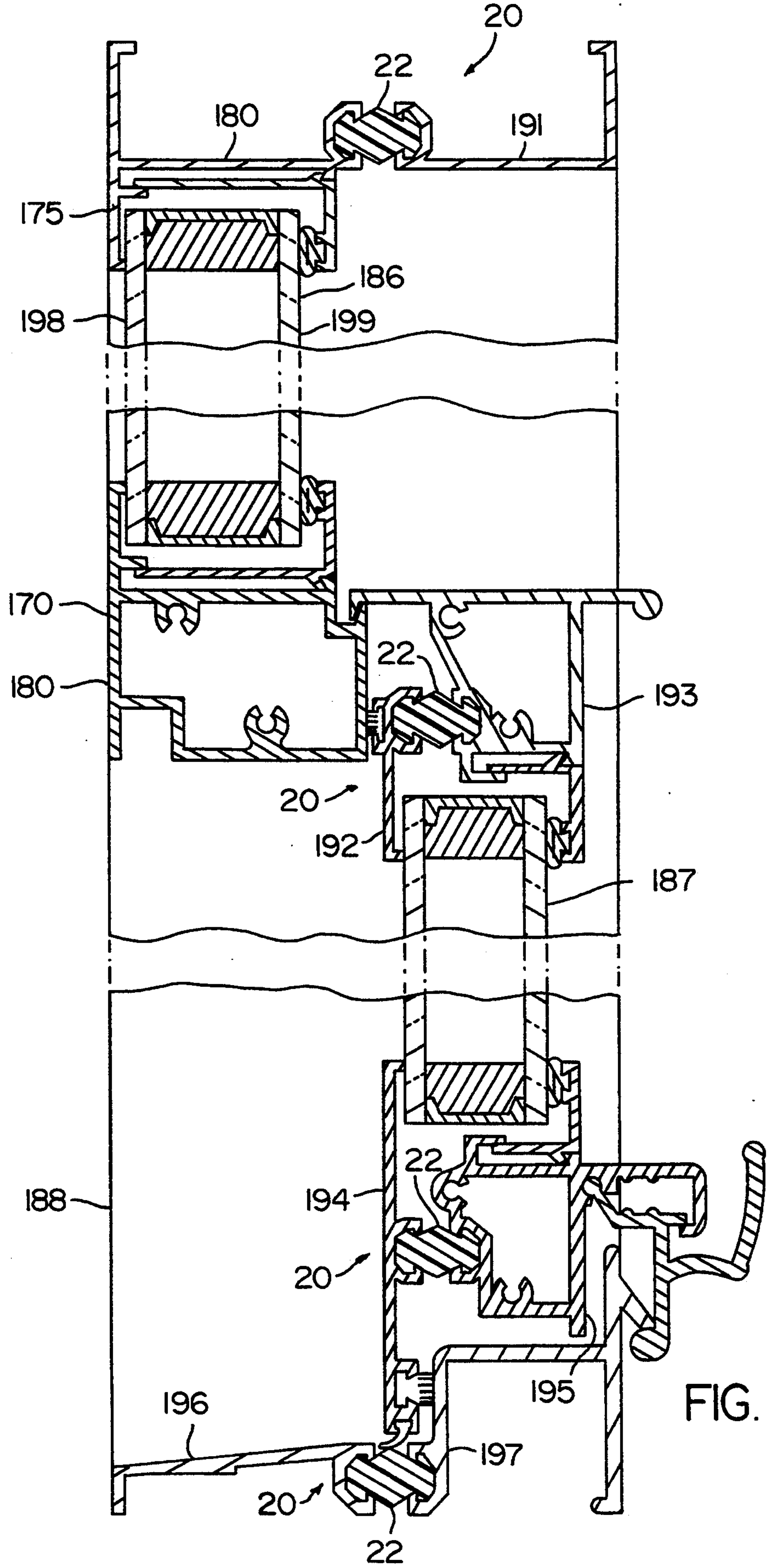
FIG. 6 of the drawings is a partial cross-sectional view of thermal barrier apparatuses in an intended environment, and, more specifically, a single hung window assembly, showing in particular, the thermally broken profile between the juxtaposed frame means wherein a portion of the frame means is in a first environment and the thermally separated frame means is in a second environment.

A plurality of thermal barrier apparatuses 20 are shown in a typically intended environment in FIG. 6. Specifically, thermal barrier apparatus 20 is shown in a conventional single hung window frame assembly 170. Window assembly 170 has been broken into three sections for illustration purposes, namely, the head section 175, the meeting rail 180 and the sill 188. Window assembly 170 includes insulated glass panels 186 and 187 and frame means 190 and 191, 192 and 193, 194 and 195, and 196 and 197—each of which frame means are restrained by stretchable attachment strip means 22.

As is typical in most window frame applications, one face of the glass panel, such as face 198 of glass panel 186, is exposed to an outside environment, and the other face 199 of the glass panel 186 is exposed to an inside environment, such as a room in a house. To reduce thermal transfer of the outside environment to the inside environment through the frame means, such as frame means 190 and 191, stretchable attachment strip means 22 mechanically joins both portions of the juxtaposed frame means so as to form a contiguous but thermally broken profile.

Figure 10:
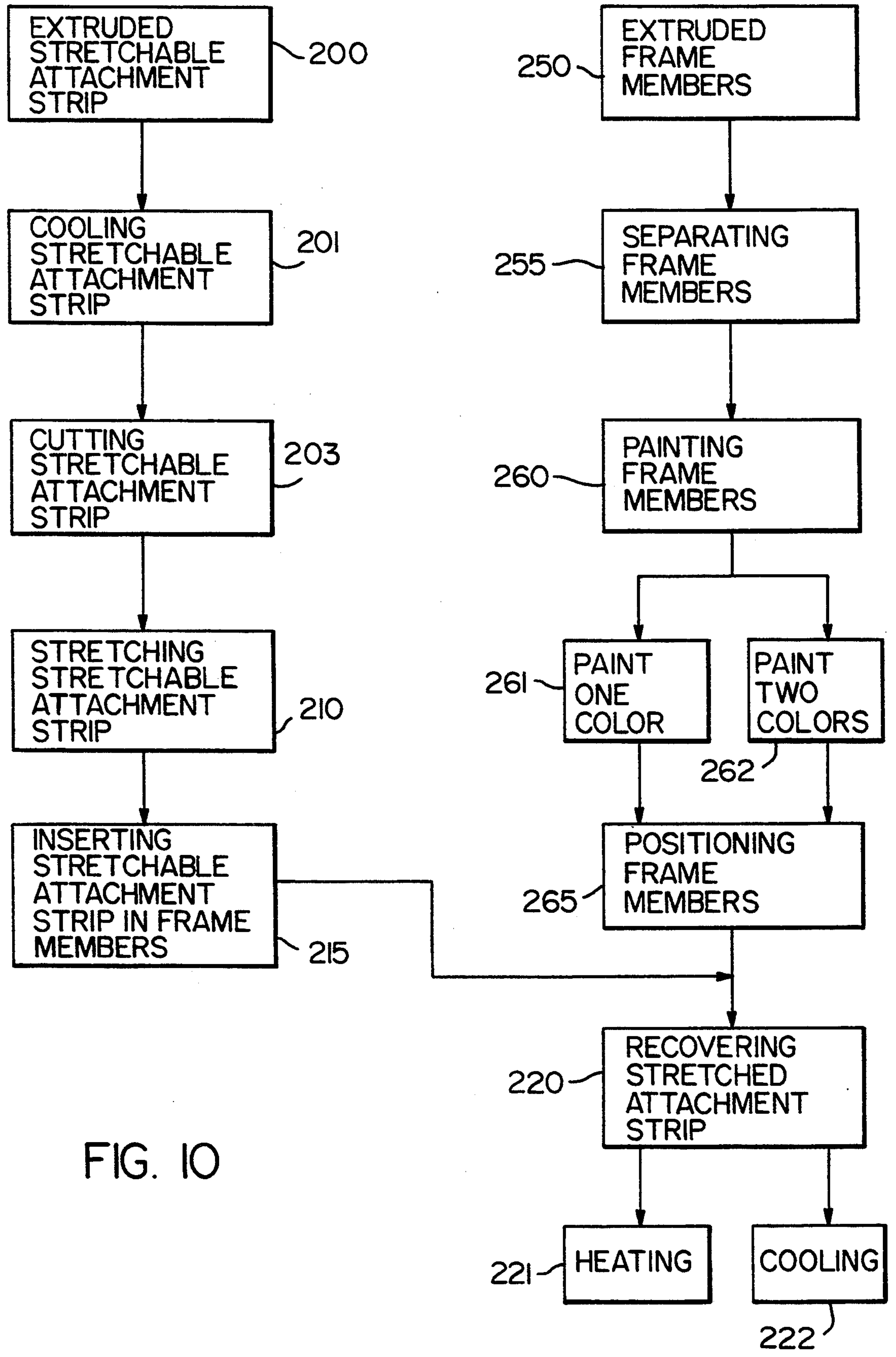
FIG. 10 of the drawings is a block diagram of the process associated with fabricating the thermal barrier apparatus.

A flow chart of the process for fabricating a thermal barrier apparatus, such as apparatus 20, as shown in FIG. 2, is shown in FIG. 10 as including the steps of extruding a stretchable attachment strip 200, such as stretchable attachment strip means 22 as shown in FIG. 1, extruding the frame members 250, such as frame means 80 and 82 as shown in FIG. 5, separating the frame members 255, painting the frame members 260, positioning the frame members 265, stretching the stretchable attachment strip to a reduced insertion shape 210, inserting the stretched attachment strip into the channels of the frame members 215, and, recovering the stretched attachment strip back toward its pre-stretched cross-sectional dimension 220 so as to bind each of the corresponding frames in a restrained insulated position. Extruding step 200 additionally includes the step of cooling 201 the strip after it is extruded, and then cutting 203 the cooled strip to a desired length.

In operation, an operator places the thermal material for what will become the stretchable attachment strip, into an extruding machine. This material may comprise a commercially available thermoplastic polyurethane, although other commercially available thermal insulation material, such as polyvinyl chloride (PVC), ethylenevinyl acetate copolymer, polyethylene, crosslinked ethylenevinyl acetate copolymer, crosslinked polyethylene, thermosetting rubber, as well as other thermosetting elastomeric plastics, among others, are also contemplated. The extruding machine is fitted with a die which will produce an extruded stretchable attachment strip having a predetermined cross-sectional configuration, such as the cross-sectional configuration of stretchable attachment strip means 22 as shown in FIG. 2. Furthermore, inasmuch as the stretchable attachment strip is fabricated from extruded material, consistent levels of quality can be maintained—due to, among other things, being able to test the material to be extruded for conformance with specification requirements. After the strip has been extruded, it is then subjected to a cooling process 201 inasmuch as the extruded material was heated prior to extrusion and generally remains too malleable if not molten immediately after extruding. This cooling process can consist of submersing the extrusion in a liquid bath, or by the use of any other convenient conventional cooling processes. After the extruded stretchable attachment strip has been properly cooled, and, accordingly, hardened, the extruded strip is put though a cutting process 203 where it is cut to a predetermined length for future insertion into the strip acceptance channels of corresponding frame members. This cutting process can be performed as part of the extruding operation, or, at a remote location. Indeed, the cutting operation may alternatively take place prior to cooling.

Independent of extruding the stretchable attachment strip, an operator engages in step 250 of extruding the frame members. Such extruding is achieved on conventional extruding machines, using conventional extruding practices and may even form connected mating frame members. Furthermore, it is preferred that the extruding die for the frame members be fabricated to produce frame members which have strip acceptance channel portions with a cross-sectional configuration substantially similar to that of the portion of the stretchable attachment strips which are to be inserted into the channels of the frame members—although non-conforming configurations are also contemplated. An example of such a conforming configuration can be seen in FIG. 2 wherein rib means 31 and 32 have substantially the same configuration as rib acceptance channel means 85, 85' of frame means 80 and 82. Furthermore, although it is preferred that the frame members be constructed from extruded aluminum, other types of materials which would require a thermal break are also contemplated for use.

Particularly if mating frame members have been extruded as connected pieces, they are separated at step 255. Once separated, the frame members proceed to step 260 and/or assembly. Painting of the frame members is accomplished by the use of conventional painting equipment, which can be manually or automatically applied. Inasmuch as the frame members are separated into individual frame halves, and not as a unitary construction requiring removal of a connecting cavity after insertion of an insulating strip, such separate frame members can be painted one color, while other ones of the frame members can be painted another color. Accordingly, should it be desired to fabricate a thermal barrier apparatus 20, as shown in FIG. 9, which comprises the frame for a single hung window assembly 170 (FIG. 9) for a residential home, one of the frame members can be painted to match the exterior color of the home, and the other juxtaposed frame members can be painted to match the color of the corresponding interior room of the home. Furthermore, such individual frame member halves eliminate the necessity for otherwise utilizing a masking procedure when two-tone painting is desired. After the frame members have been painted as desired, they are then aligned and releasably maintained 265 in juxtaposition with each other wherein their respective strip acceptance channels are positioned adjacent to each other. Although aligning and releasably maintaining the frame members can be accomplished by manually securing the frame members together, it is preferable that an appropriate fixture be used.

Either prior to, or after the juxtaposed frame members have been aligned and releasably maintained, the stretchable attachment strip must be stretched at step 210 until it reaches its reduced insertion shape. The reduced insertion shape is not only dependent on the dimensions of the strip acceptance channels (inasmuch as the stretched strip must be able to be inserted therein with little to no interference), but it is also dependent upon the recoverability characteristics of the particular material used for the stretchable attachment strip extruded—inasmuch as proper recovery is needed for the recovered strip to bind the frame members in a restrained insulated position. Furthermore, although a particular material may only recover back to 85% of its pre-stretched shape, additional recovery can be obtained by applying heat as in step 221, or, cooling the stretched attachment strip, as in step 222. For example, it has been found that stretching an attachment strip extruded from thermoplastic polyurethane 100% (by applying stretching loads below 400 lbs.) in a linear direction, the stretched strip will recover approximately 90%. Additional recovery was also observed upon exposing the recovered thermoplastic polyurethane attachment strip to heat.

The actual stretching 210 of the stretchable attachment strips can be accomplished on numerous types of stretching apparatuses. For example, the stretching can be done on a machine which simultaneously pulls both ends of the stretchable attachment strip so as to apply substantially equal tensile stress to the strip. Such an apparatus can also be used to restrain only one end of the stretchable attachment strip while pulling on the other end. The tensile stress applied to the stretchable attachment strip as it is being stretched is far greater than any forces which the recovered attachment strip would be exposed to when functioning as a thermal break for such products as windows and door frames. Furthermore, it is preferred that the attachment strip be constructed from a material having a Shore D durometer hardness reading of 40 to 60 after such recovery. It is also contemplated that any such stretching apparatus used be configured with non-slip gripping members which have a cross-sectional configuration that accommodate the portion of the stretchable attachment strip to be gripped.

Inasmuch as recovery of the stretched strip begins immediately upon release from the stretching machine, step 215, insertion of the strip into the strip acceptance channels of aligned and releasably maintained juxtaposed frame members should not be delayed. Such insertion is accomplished by inserting the stretched attachment strip between the strip acceptance channels of the juxtaposed frame members until it is approximately centered therein. As the attachment strip continues to recover, it automatically spaces apart the juxtaposed frame members. Such automatic spacing continues until the attachment strip mechanically binds the juxtaposed frame members together in a restrained insulated connection, as shown in FIG. 3. Additional restraint is also contemplated by applying a commercially available adhesive to the strip acceptance channel or the stretched attachment strip prior to recovery of the stretched attachment strip.

The foregoing description and drawings merely explain and illustrate the invention and the invention is not limited thereto except insofar as the appended claims are so limited as those skilled in the art who have the disclosure before them will be able to make modifications and variation therein without departing from the scope of the invention.

What is claimed is:

1. A process for constructing a thermal barrier apparatus which thermally improves the mechanical connection between two or more juxtaposed separated frame members having strip acceptance channels for acceptance of a portion of an attachment strip, wherein each of the two or more juxtaposed separated frame members are connected by one or more stretchable attachment strips each having a longitudinal axis, an exterior surface including a first side, a second side opposite the first side, a top side, a bottom side opposite the top side, and a transverse cross-sectional dimension, and wherein each of the juxtaposed frame members may be exposed to different temperatures and environmental conditions after the thermal barrier apparatus is constructed, the process comprising the steps of:

aligning and maintaining the two separated frame members in juxtaposition in preparation for insertion of the stretchable attachment strips;

stretching the one or more stretchable attachment strips from a first transverse cross-sectional dimension which is greater than that of the transverse cross-sectional dimension of the corresponding strip acceptance channel, to a second transverse cross-sectional dimension less than the transverse cross-sectional dimension of the corresponding strip acceptance channel;

inserting the one or more stretched attachment strips between the two or more juxtaposed frame members so that at least a portion of the one or more stretched attachment strips are operably positioned within the corresponding strip acceptance channels of the frame members; and recovering each of the stretched attachment strips back toward the first transverse cross-sectional dimension so as to bind a portion of the stretchable attachment strip within the corresponding strip acceptance channels to, in turn, result in a restrained thermal connection therebetween the two juxtaposed frame members.

2. The process according to claim 1 in which the step of recovering each of the one or more stretched attachment strips further comprises the step of exposing the one or more stretched attachment strips to temperatures other than those experienced through ambient air so as to induce recovery toward the first transverse cross-sectional dimension.

3. The invention according to claim 1 in which the process for constructing a thermal barrier apparatus further includes the step of extruding the one or more stretchable attachment strips; and cooling the one or more stretchable attachment strips after it is extruded.

4. The invention according to claim 1 in which the step of recovering each of the stretched attachment strips substantially back toward the first transverse cross-sectional dimension, so as to bind a portion of the stretchable attachment strip within the corresponding strip acceptance channels serves to automatically space apart the two juxtaposed frame members, the automatic spacing apart occurring as the result of expansion forces which occur as the one or more stretched attachment strips recover back toward the first transverse cross-sectional dimension.

5. The invention according to claim 1 in which the process for constructing a thermal barrier apparatus further comprises the step of painting each of the two separated frame members prior to the step of inserting the one or more stretched attachment strips into the corresponding strip acceptance channels.

6. The process according to claim 5 in which the step of painting the two separated frame members further includes the step of painting at least one of the two separated frame members a different color than that of the other.

7. The invention according to claim 1 in which the process for fabricating a thermal barrier apparatus further includes the step of applying adhesive to a portion of the acceptance channels prior to the step of inserting the one or more stretched attachment strips therein.

* * * * *